(12) United States Patent
Rezvan

(10) Patent No.: US 9,690,454 B2
(45) Date of Patent: Jun. 27, 2017

(54) METHODS AND SYSTEMS FOR REMOTELY VIEWING AND AUDITING CELL SITES COMPRISING A DIGITAL DATA STRUCTURE COMPRISING A SUBSTANTIALLY 360 DEGREE DIGITAL REPRESENTATION OF THE SITE

(71) Applicant: Amir H. Rezvan, Kirkland, WA (US)

(72) Inventor: Amir H. Rezvan, Kirkland, WA (US)

( * ) Notice: Subject to any disclaimer, the term of this patent is extended or adjusted under 35 U.S.C. 154(b) by 495 days.

(21) Appl. No.: 14/213,512

(22) Filed: Mar. 14, 2014

(65) Prior Publication Data

US 2014/0298181 A1    Oct. 2, 2014

Related U.S. Application Data

(60) Provisional application No. 61/801,726, filed on Mar. 15, 2013.

(51) Int. Cl.
*G06F 3/0484* (2013.01)
*H04N 1/00* (2006.01)
*H01Q 1/24* (2006.01)

(52) U.S. Cl.
CPC .......... *G06F 3/0484* (2013.01); *H01Q 1/246* (2013.01); *H04N 1/00* (2013.01)

(58) Field of Classification Search
None
See application file for complete search history.

(56) References Cited

U.S. PATENT DOCUMENTS

| | | | | |
|---|---|---|---|---|
| 5,600,443 A * | 2/1997 | Frey | ........................ | C09D 11/16 |
| | | | | 250/226 |
| 8,731,247 B2 * | 5/2014 | Pollock | ................... | G01C 11/02 |
| | | | | 382/108 |
| 9,316,486 B2 * | 4/2016 | Neubauer | ............. | G06T 7/0042 |
| 2008/0284669 A1 * | 11/2008 | Hunton | ..................... | H01Q 1/22 |
| | | | | 343/757 |
| 2009/0015498 A1 * | 1/2009 | Deng | ..................... | H01Q 1/246 |
| | | | | 343/757 |
| 2009/0135074 A1 * | 5/2009 | Yang | ..................... | H01Q 1/246 |
| | | | | 343/766 |
| 2010/0033371 A1 * | 2/2010 | Kumagai | ............... | G01C 11/02 |
| | | | | 342/357.31 |
| 2010/0069035 A1 * | 3/2010 | Johnson | .................. | H04W 4/02 |
| | | | | 455/404.1 |
| 2011/0235923 A1 * | 9/2011 | Weisenburger | ........ | G01C 11/00 |
| | | | | 382/201 |
| 2012/0231425 A1 * | 9/2012 | Calman | .............. | G06K 9/00671 |
| | | | | 434/93 |

(Continued)

*Primary Examiner* — Tsung-Yin Tsai
(74) *Attorney, Agent, or Firm* — King IP Law; Joshua King

(57) ABSTRACT

Digital data structures of cell sites that can be reviewed, interrogated and manipulated so that users can investigate the cell site remotely. The digital data structures contain data for the elevated antenna holding structure and for each desired cell site component, such as the cellular antennas, microwave dishes. The digital data structures contain high resolution optical information about the cell site so that desired elements can be distinguished and read; relative spatial relationship data so that the relative spatial relationships between the different components can be determined to and automatically generated angular adjustment data to reduce perspective distortions of the cell site components.

25 Claims, 4 Drawing Sheets

(56) References Cited

U.S. PATENT DOCUMENTS

| | | | | |
|---|---|---|---|---|
| 2012/0280624 A1* | 11/2012 | Baaijens | ............... | A47F 11/10 |
| | | | | 315/149 |
| 2014/0205205 A1* | 7/2014 | Neubauer | ............ | H01Q 1/125 |
| | | | | 382/291 |
| 2014/0225985 A1* | 8/2014 | Klusza | ............. | H04N 13/0207 |
| | | | | 348/43 |

* cited by examiner

Fig. 3

METHODS AND SYSTEMS FOR REMOTELY VIEWING AND AUDITING CELL SITES COMPRISING A DIGITAL DATA STRUCTURE COMPRISING A SUBSTANTIALLY 360 DEGREE DIGITAL REPRESENTATION OF THE SITE

CROSS-REFERENCE TO RELATED APPLICATIONS

The present application claims the benefit of copending U.S. Provisional Patent Application Ser. No. 61/801,726, filed Mar. 15, 2013, which application is incorporated herein by reference in its entirety.

BACKGROUND

Auditing cell sites for maintenance and repair has typically been and expensive and painstaking process that requires sending technicians to a cell site to manually review, measure, photograph, read, etc., each of the cell site components as well as the cell tower or other structure holding the cell site components such as cell antennas, microwave dishes, etc. In addition, since the cell site components benefit from elevated placement compared to the surrounding area, the cell site components are often found atop very high towers, mountains, buildings, etc., and thus it can be dangerous for the technicians and tower climbers that may need to climb the tower or go on to the top of a roof of a building.

Thus, there has gone unmet a need for improved systems and methods for auditing cell sites for maintenance and repair, or for other purposes as desired, for example to provide for such auditing in a less expensive, more accessible or safer manner.

The present systems and methods, etc., provide one or more of these and/or other advantages.

SUMMARY

The present systems, devices and methods, etc., provide improved systems and methods of cell site auditing, control, interrogation and/or maintenance. For example, the systems and methods provide digital data structures of the cell site that can be reviewed, interrogated and manipulated so that users can investigate the cell site remotely, and where the cell site can be recorded for review without climbing and with fewer expenses. The digital data structures contain data for the elevated antenna holding structure (i.e., the building, cell tower, radio mast, etc.) holding cell site components and for each desired cell site component, such as the cellular antennas, microwave dishes, etc., attached to the elevated antenna holding structure. The digital data structures contain high resolution optical information about the cell site so that all desired elements can be distinguished and read, such as a bar code (2D, 3D or otherwise), or other specific identifier such as a manufacturer's name of the item and model number, type of connector, type of coaxial cable, the type of insulation used and the condition of anti-rain insulation.

The digital data structures also contain relative spatial relationship data so that the relative spatial relationships between the antenna holding structure and cell site components can be determined to at least such a degree that a need for maintenance can be determined. The digital data structures also contain automatically generated angular adjustment data adequate to eliminate perspective distortions of the cell site components due to the viewing angle between an imaging device that obtained the digital images used to create the digital data structure.

These and other aspects, features and embodiments are set forth within this application, including the following Detailed Description and attached drawings. Unless expressly stated otherwise, all embodiments, aspects, features, etc., can be mixed and matched, combined and permuted in any desired manner.

BRIEF DESCRIPTION OF THE DRAWINGS

FIG. 3 depicts an example of an array of digital images suitable for a digital data structure herein.

DETAILED DESCRIPTION

The systems herein provide easier, less expensive and/or safer auditing of cell sites, including remote auditing if desired. The advantage(s) are achieved by obtaining digital images of the cell site adequate for a substantially 360° view of the cell site, i.e., enough of a view to be able to determine the location, status and quality of each desired cell site component under audit, then combining the images and subjecting them to automated algorithms and/or manual techniques that remove distortions in the images to create a digital data structure representing the cell site accurately. Achieving such a 360° view can be implemented by taking images from 360° of different locations, but can also be achieved using much less than 360° of locations. For example, images may be taken from slightly more the 180° of locations, such as 200° of locations, and still provide the substantially 360° view. Still further, in some aspects the methods, etc., herein can be implemented on substantially less than a 360° view, provided that adequate coverage of desired, target components and structures is present in the data structure to determine change over time in relative spatial relationships between the antenna holding structure(s), cell site components, etc., to at least such a degree that a need for maintenance can be determined.

Figure 1:
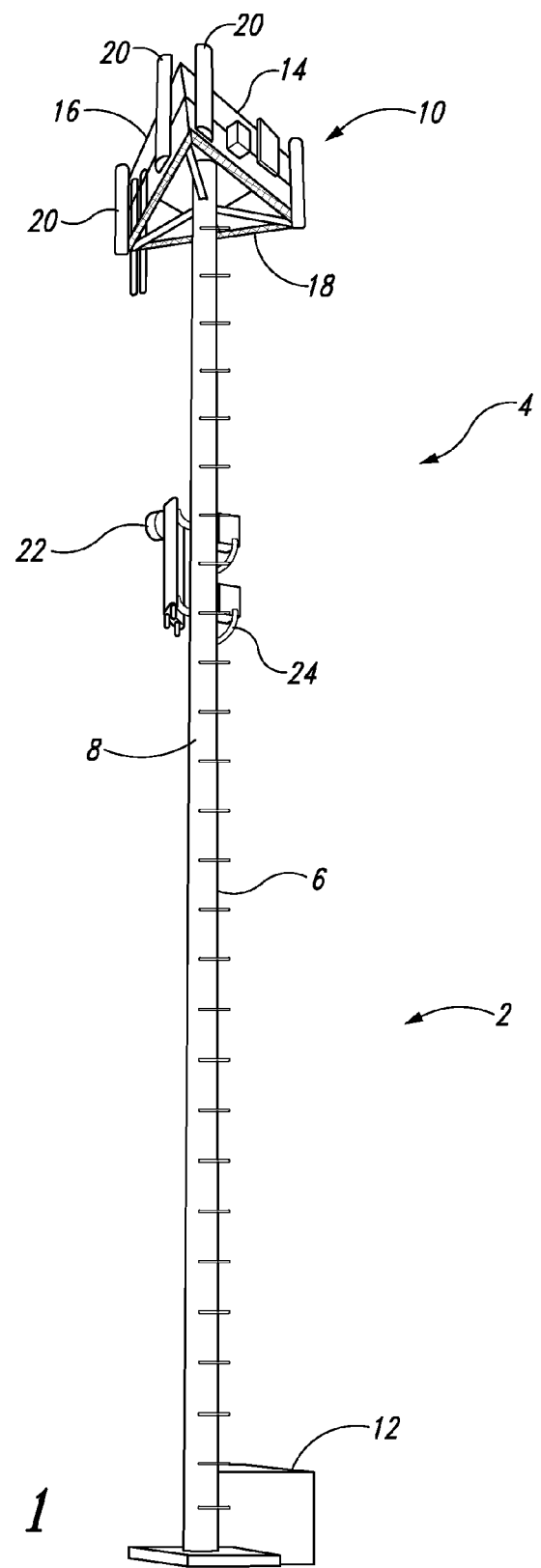
FIG. 1 depicts a side perspective view of a cell site.

Turning to the Figures, FIG. 1 depicts a side perspective view of a cell site 2 comprising cell site structures 4 such as elevated antenna holding structure 6, which in this case is a very high tower mast 8, as well as a plurality of cell site components 10 at the top of the tower mast 8, and a shelter or cabinet 12 at the bottom.

As used herein, cell site has its normal meaning, for example as stated at Wikipedia, http://en.wikipedia.org/wiki/Cell_site: "a cell site is a site where antennas and electronic communications equipment are placed, usually on a radio mast, tower or other high place, to create a cell (or adjacent cells) in a cellular network. the elevated structure typically supports antennas, and one or more sets of transmitter/receivers transceivers, digital signal processors, control electronics, a GPS receiver for timing (for CDMA2000/is-95 or GSM systems), primary and backup electrical power sources, and sheltering". Each side of a cell site is a sector 14, 16, 18. There are usually 3 sides or sectors to the cell site although there could be more, less, or even no sides (what is called an omni, all directions).

Figure 2:
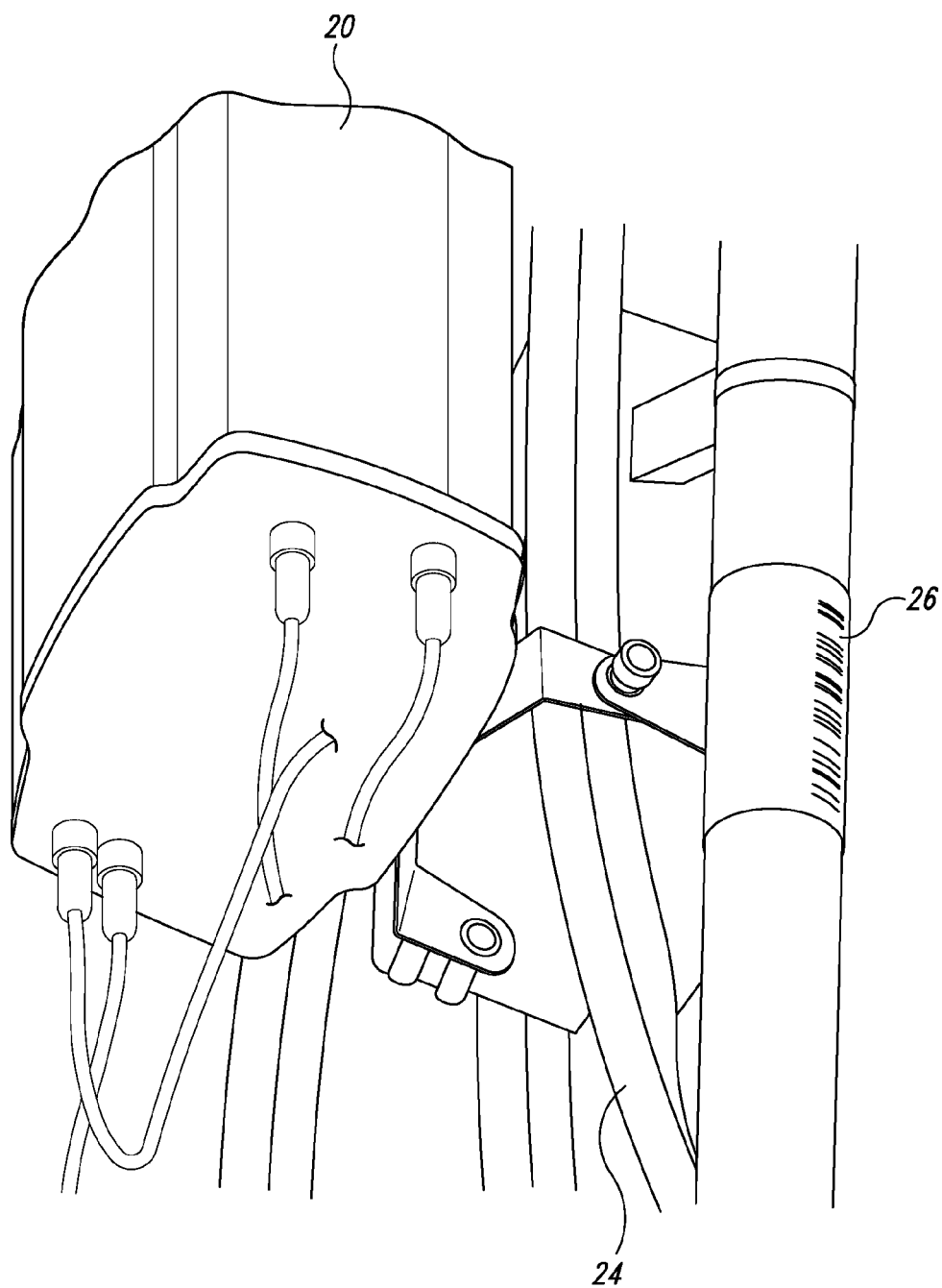
FIG. 2 depicts a close up view of exemplary cell site components including coaxial cables and a bar code.

Elevated antenna holding structure 6 holds cell site components 10 at the top, which often, and as shown, is very high above the ground. Thus, manual auditing the components is somewhat dangerous and quite labor intensive. Cell site components include a cellular antenna 20, a microwave dish 22, coaxial cables 24 and bar code 26 (seen in FIG. 2). Typically, the bar is no more than about 1"×1" (2.5 cm×2.5 cm) in length and width and more typically no more than about 0.75"×0.75" (2.0 cm×2.0 cm) in length and width.

In the systems herein, a digital data structure is created that accurately represents the cell site 2. Such digital data structure thus comprises at least cell site structures such as the elevated antenna holding structure 6, at least one cellular antenna 20 attached to the antenna holding structure 6 and a bar code 26. The digital data structure is made, in part, of digital images depicting a substantially 360° view of the cell site 2. The digital data structure further comprises a) relative spatial relationship data adequate to determine relative spatial relationships between the antenna holding structure 6 and the antenna, for example to less than about 1.0 cm, 0.5 cm, or 0.1 cm when measured in units of length, or less than about 5°, 3°, 1°, 0.5° when assessed in angular measurement units. The digital data structure further comprises b) image resolution data adequate to read the at least one bar code 26, and/or c) automatically generated angular adjustment data adequate to eliminate perspective distortions of the cell site 2 due to a viewing angle by an imaging device that obtained the digital images, for example adequate to determine if cell site components more than about 1.0 cm, 0.5 cm, or 0.1 cm when measured in units of length, or less than about 5°, 3°, 1°, 0.5° when assessed in angular measurement units out of plumb or true or otherwise moved from their desired position.

One example of a suitable approach to gathering the digital images, which can be photos, 3D photos, video, 3D video or other digital or digitizable images, is discussed below and refers to FIG. 3, which depicts an example of an array of digital images suitable for a digital data structure herein.

Figure 3:
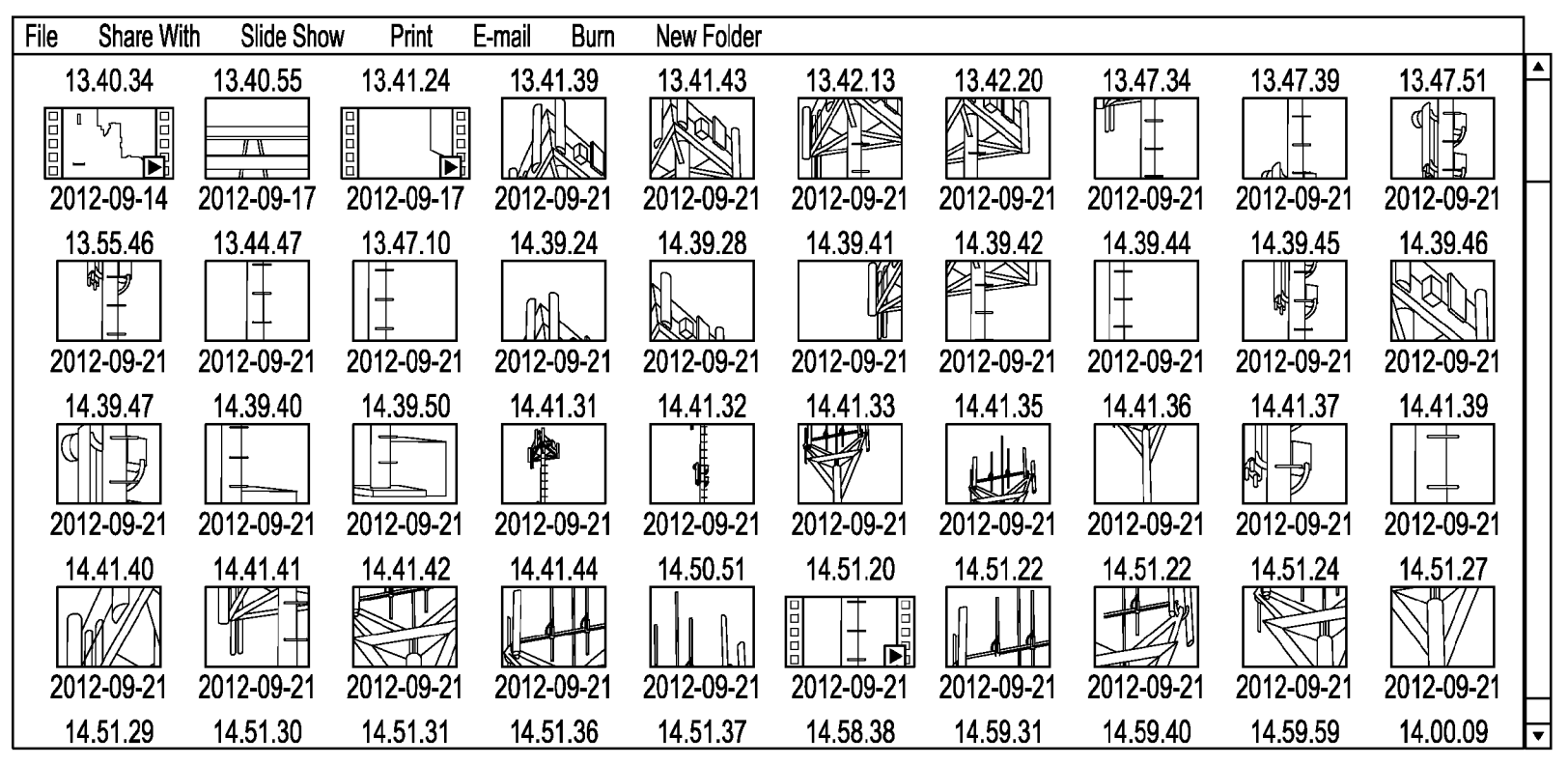

A suitable digital imaging device such as a 16 megapixel SLR camera with a telephoto lens and a CMOS, CID OR CCD sensor takes a panorama of images of the tower, 3-4 columns by 5-6 rows as in FIG. 3. The images typically are progressive, for example starting at the top of the tower and moving down to the point where the wires go into the tower. The photos are typically taken facing the antennae, i.e., directly facing the respective sector.

After all three sectors have been completed, photos can be imported or transferred to a computer and then an image editor such as Microsoft ICE® (Image Composite Editor) can be used to stitch together each batch of photos. In FIG. 3, photos 14.39.24-14.39.50 comprise one batch. Typically, each batch represents a given level of the cell tower.

A video of the cell tower and its surrounding area can then be taken to show the context of the tower, for example using a wide angle lens. If possible, the cabinet should then be entered a video or multiple still images should be taken of the interior of the showing all desired details. This gives a user a "tour" of the cabinet and other areas.

The photos and video can then be saved to a desired location, such as a folder titled with the latitude and longitude of the cell site. The photos can be taken in jpeg or other suitable format, and the exposure of the photos should be adjusted to properly for the cell tower, cell tower components, etc., not the sky. The photos typically overlap a little bit so as not to leave gaps in the panorama.

In some embodiments, the digital images are captured using an imaging device comprising a "rangefinder", i.e., a device able to measure the distance to the target of the given image, and an angular detection device, i.e., a device such found in total robotic stations, able to determine an record the relative elevational angle of the imaging device relative to the target. This can be particularly useful with targets elevated well above the viewer/imaging device such as those at the top of a tall cell tower or a building.

In another exemplary method of making the digital data structure, an array of digital images an array high definition pictures are taken using suitable equipment such as a 500 mm telephoto lens and a camera containing an APS-C sensor having at least 14 megapixels and that also has a GPS/time recording unit to record both the location and date/time of the images. The images are then subjected to computer processing and assembled in a panorama to provide the optical elements of the digital data structure.

An exemplary digital imaging device and digital image processing software can have the following features:

Readable Resolution: 5.49 ft$^2$ FOV
  750 mm=3.3°;
  3.1415926×100 ft=314.1593 ft=C;
  C×3.3/360=2.87 foot frame;
  2.87 ft×2/3(sensor area)=1.91 ft;
  1.91 ft×2.87 ft=5.49 ft$^2$ FOV.
  Translated: Viewing objects from a size of 0.1 mm-3 mm
Aperture: f./5.6-f./8.0
Video Quality: 1920×1080 pixels
Focal Range: 225 mm-750 mm (35 mm equiv.)
ISO: 100-640
Pixel Density: 300 pixels/inch$^2$
Shutter Speed: $1/500^{th}$-$1/8000^{th}$
# of photos in the stitches: 9-21 with average of 15
Size of the stitches: 5 mp-100 mp with average of 40 mp When taking the digital images, the Angle of the camera to target is typically as low as possible relative to the ground while staying within distance range of the target, for example with an elevation of 0-75 degrees, usually about 25 degrees, although a photo looking straight up (90 degrees) at the tower can also be taken. The distance of the photographer to the tower can be any suitable distance, for 1 ft-175 ft with average of 75 ft. Photos can be taken orthogonal to the antennae although other angles can also be used.

The panorama and digital data structure is then used to identify issues with the cell tower and cell site components such as non-plumb antennas, mechanical down tilt measurement, condition of coaxial cables and types of connectors, the presence of crossconnects (e.g., when sector 1 cables are connected to sector 2 antennas), correct color coding of the cables, age and wear and tear of the cables and other components, etc.

These image are typically are taken from 3 different sides of the tower traditionally known in cellular field as A B C, or sector 1, sector 2 and sector 3.

In some embodiments, the digital data structures and methods, etc., herein permit engineers and technicians to view the cell site remotely, for example from an office or workroom or other cell site, and see objects down to 1 mm or less.

The digital data structures, etc., herein provide a combination of visual and text-based data and can be uploaded to a website or other remotely accessible platform. At the website, the text-based and other data in the digital data structure can be amalgamated with pre-existing data and displayed to the client on the website along with the imaging data.

The length of items in the images can be calculated, for example, by providing a length-standard element such as 1 meter or 25 cm long measuring stick or gradations on the cell tower or next to the cell tower components, then manually or automatically recognizing the measuring stick or gradations then comparing them to adjacent cell tower components. In one embodiment, the measure gradations are climbing pegs on the tower, which average 30 cm apart. Using this information, a computer program (or visual inspection) can calculate or approximate the length of any object on a cell tower including the height of the tower, the coaxial cables, the feeder, the base transceiver station jumper, the cellular antennae, etc.

The digital data structure typically comprises adequate information to determine at least downtilt from 0 to −15 degrees with reference to the horizon and uptilt from 0-30 degrees with reference to the horizon.

Figure 4:
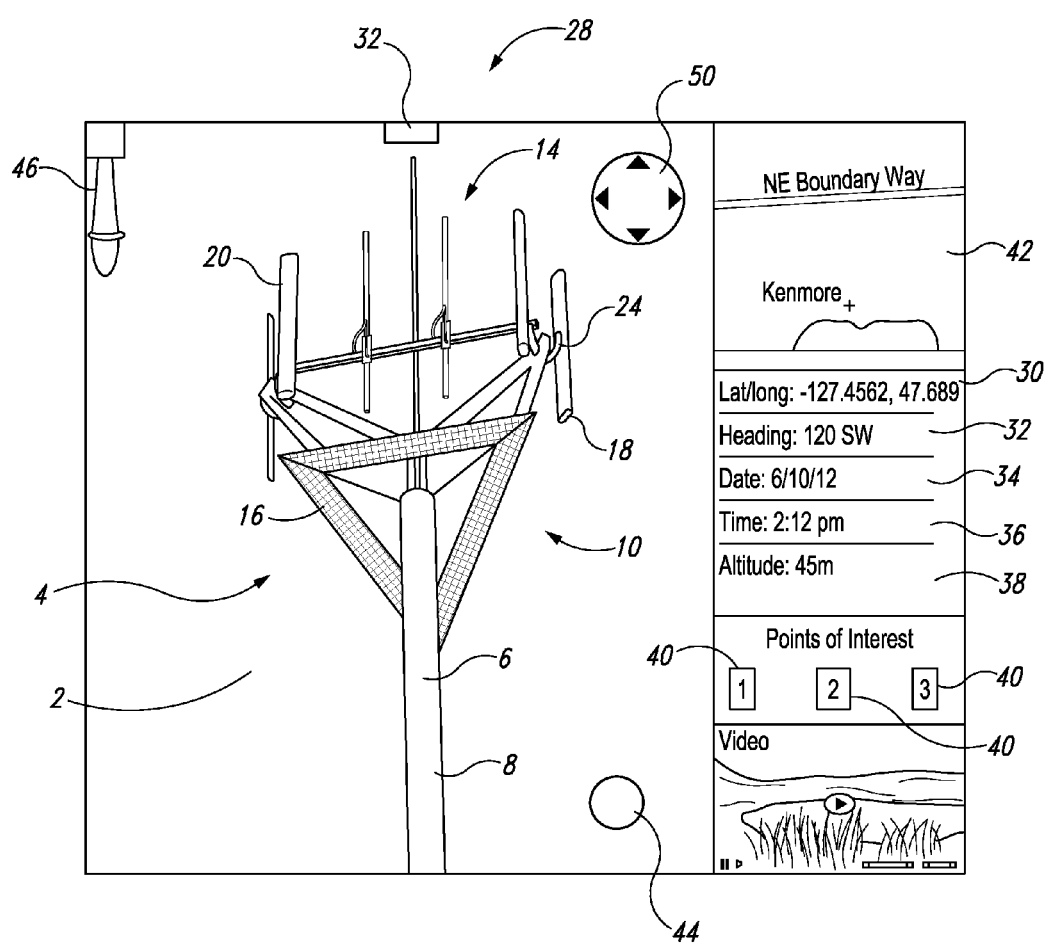
FIG. 4 depicts an exemplary screen shot of a partial representation of the features that can be accomplished with the digital data structures and user tools herein.

Turning to some computer-based presentations of the digital data structure to users, FIGS. 4 and 5 depict exemplary screen shots of partial representations of the features that can be accomplished with the digital data structures and user tools herein.

FIG. 4 shows an interactive, graphical user interface 28 comprising certain data such as latitude/longitude 30, heading 32—i.e., geographic direction, which can be, e.g., geodetic North, grid North, magnetic North, etc., date 34, time 36, and altitude 38. The information can be created and/or embedded in an image using a geotagging device. Other information that can be incorporated into the digital images and thus into the digital data structure include elevation of the user who took the photo, who took the photo, resolution of the photo, color space of the photo, lens information, shutter speed, metering pattern, focal length, and aperture.

Graphical user interface 28 comprises at least one point of interest button 40 to add points of interest and comment on them. Graphical user interface 28 also comprises a dynamic minimap 42 showing the location of the cell site 2, and a comment button 44 allowing engineers to collaborate together on potential problems and see each other's comments. Zoom slider 46 on the main image 48 permits zooming and minimizing, and pan button 50 permits panning, pitching, yawing and rolling as desired.

Automatic panning across the photo, e.g., from left to right and then down and reverse can be implemented if the mouse is left static for more than a preset time, for example one minute, and video can be uploaded if desired.

Other features that can be incorporated into the digital data structure and the graphical user interface 28 include:
1) Point of view video—using video to show the tower and the surrounding area, using compass metadata to rotate the camera in the minimap with the video showing a virtual coverage map.
2) Nearby cell site—select a tower pin in the main map and it creates a circle with desired radius, e.g., 1 mile, showing all the cell towers and other relevant information in that vicinity. This can be used to help to show potential coverage gaps.
3) Create point of interest module—allows for creation of pins that show particular points of interest. Each pin can have comments as well for other engineers to see.
4) Angle tool—allows user to determine the angle between any two cell site components.
5) Attach tools—allow engineers to attach documents or excel sheets, etc., containing existing or new information about the cell site and any measurements therein.
6) Measurement addition tool—that allows engineers to add measurements to the image and digital data structure they already know, for example in the side bar comments section.
7) "Hot Corners"—shows the estimated height of the mouse on the tower in the bottom left corner, dynamic stats.
8) Length estimation tool—allows a user to assign an arbitrary distance measure in the image then use that measure to determine the relative distance or length of other components in the image compared to that arbitrary distance measure. For example, the distance between two poles can be set as 1 meter then other items in the image can be relatively estimated compared to that reference.)
9) Color code button—allows users to view color of cell site components and/or assign color to certain cell site components.
10) Auto recognition tool—recognizes cell site components on top of the tower and catalog them.

Returning to FIGS. 1-3, the cell site 2 typically comprises at least two cellular antennas 20 attached to the antenna holding structure 6 and the digital data structure can comprise relative spatial relationship data adequate to determine relative spatial relationships between each of the antenna holding structure 6 and the two cellular antennas 20 to less than about 1.0 cm. The cell site 2 can further comprise at least one color-coded coaxial cable 24 and the digital data structure can further comprise color data adequate to automatically identify color of the color-coded coaxial cable. In other embodiments, other coaxial cable labeling approaches, such as using a specified number of strips of black tape to identify the cables can be identified and appropriately labeled. The digital data structure can also identify and distinguish a second color-coded or otherwise labeled coaxial cable.

The cell site 2 can also comprise at least one microwave dish 22 and the digital data structure can comprise relative spatial and angular relationship data adequate to determine relative spatial and angular relationships between the one microwave dish 22 and the other cell site components 10. The digital data structure can comprise at least one of, or all of, a) geographic location of the cell site 2, b) altitude of the cell site 2, c) date/time of the digital images, and d) gps coordinates of the cell site 2. The angular adjustment data can also automatically adjust for elevational differences between the imaging device and the cell site components 10 and the digital data structure can comprise comments manually added by a user. The digital data structure can comprise metadata configured for interaction between a user and digital information in the digital data structure.

The digital data structure can comprise at least one historic digital representation of the cell site 2 comprised of historic digital images depicting a historic substantially 360° view of the cell site 2. The historic digital representation comprises adequate spatial and angular relationship information to determine historic relative spatial and angular relationships between at least the antenna holding structure 6 and the cellular antennas 20 and cell site components 10. There can be a plurality of historic digital representations of the cell site 2 with each historic digital representation identified chronologically; if desired, a series of historical digital representations can be played chronologically to show movement over time of cell site components 10. The digital data structure can comprise algorithms configured to compare the digital representation of the cell site 2 to the historic digital representation of the cell site 2.

The digital data structure can comprise algorithms configured to specifically display to a user any differences found between the digital representation of the cell site 2 and the historic digital representation of the cell site 2.

The digital data structure can comprise algorithms configured to automatically identify and label display elements in a display of the digital data structure to a user, the display elements comprising at least one of, up to all of, a) the cell site components 10, b) elevation of the cell site components 10 relative to the imaging device, c) geographic position of the cell site 2, d) geographic direction of at least one cell site component 10, and e) relative angular position of at least one cell site component 10 relative to the elevated antenna holding structure 6.

The digital representation of the cell site 2 can comprise an image of a length-standard element placed on the cell site 2 and the digital data structure can comprise algorithms configured to automatically identify and label a length of at least one cell site component 10 to a user based on the length-standard element placed on the cell site 2.

The digital representation of the cell site 2 can comprise an image of a color-standard element placed on the cell site 2, the digital data structure can comprise algorithms configured to automatically identify and label a color of at least one cell site component 10 to a user based on the color-standard element placed on the cell site 2. When the digital data structure comprises at least one historic digital representation of the cell site 2 comprising the color-standard element placed on the cell site 2, the algorithms can be further configured to automatically determine and identify age of the at least one of the elevated antenna holding structure 6 and the cell site component 10 based on color change over time, such as automatically determine and identify the age of the cell site component 10.

The digital data structure can comprise color correction algorithms data configured to read an ambient wavelength response of the color-standard element due to ambient conditions and automatically adjust color information within the digital data structure to adjust for the ambient conditions. The digital data structure can also comprise data associating multiple carrier-specific colors to respective multiple carriers. The multiple carrier-specific colors can be correlated to respective multiple carrier-specific sector 14, 16, 18 of the elevated antenna holding structure 6 and the digital data structure can comprise algorithms configured to identify cross-connects between the carrier-specific colors and the multiple carrier-specific sectors sector 14, 16, 18.

The digital images of the cell site 2 comprise 3D digital images obtained from a 3D digital imaging device and the digital representation of the cell site 2 can display the cell site 2 in 3D to a viewer.

The digital data structure can be combined or compiled into a large cell site database of numerous cell sites, cell towers and cell site components. The cell site database can contain both visual and text components for each tower, for groups of towers, and for towers observed and changed over time. The cell site database and associated digital data structures and photos can provide the angle of the components in reference to each other and to the tower mast, the color coding of the cables, and to identify the individual components on the tower. Other features include cell site component recognition, component condition recognition, component size recognition, respective angle identification, component model number recognition, image comparison, component 3d modeling, conversion to Absel drawing for example for cell site planning, auto maintenance and cell site optimization, auto fault recognition, data extrapolation, and cell site video logs. Such recognition can be achieved by any suitable methods or devices, including for example manually identifying components or elements, or by using automated shape recognition, size recognition, data base matching, etc.

Certain aspects of imaging methodologies and digital data structure creation and usage can be used with any desired target including targets not associated with the cellular or telecommunications industry. For example, the methods of creating digital data structures and databases with automatic corrections for angular distortions due to perspective is useful for almost any imaging target in almost any field, for example when combined with the auto-distancing and specific lensing and camera information embedded in the images and digital data structures.

The present application is further directed to methods of making the various elements of the systems and apparatus herein, including making the systems and apparatus themselves from such elements, as well as to methods of using the same.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A digital data structure of a cell site, the cell site comprising cell site components comprising at least one elevated antenna holding structure, at least one cellular antenna attached to the antenna holding structure and a bar code, wherein the digital data structure comprises a digital representation of the cell site comprised of digital images depicting desired, target components and structures of the cell cite adequate to determine change over time in relative spatial relationships between the target components and structures of the cell site, and wherein the digital data structure further comprises a) relative spatial relationship data adequate to determine relative spatial relationships between the antenna holding structure and the antenna to less than about 1.0 cm, b) image resolution data adequate to read the at least one bar code, and c) automatically generated angular adjustment data adequate to eliminate perspective distortions of the cell site components to less than about 1.0 cm, wherein the perspective distortions are due to a viewing angle by an imaging device that obtained the digital images.

2. The digital data structure of claim 1 wherein the cell site further comprises at least two cellular antennas attached to the antenna holding structure and the digital data structure further comprises relative spatial relationship data adequate to determine relative spatial relationships between each of the antenna holding structure and the two cellular antennas to less than about 1.0 cm.

3. The digital data structure of claim 1 wherein the cell site further comprises at least one color-coded coaxial cable and the digital data structure further comprises color data adequate to identify color of the color-coded coaxial cable.

4. The digital data structure of claim 2 wherein the cell site further comprises at least a second color-coded coaxial cable having a different, second color and the digital data structure further comprises color data adequate to identify color of each color-coded coaxial cable and to distinguish between them.

5. The digital data structure of claim 1 wherein the cell site further comprises at least one microwave dish and the digital data structure further comprises relative spatial relationship data adequate to determine relative spatial relationships between the one microwave dish and the other cell site components to less than about 1.0 cm.

6. The digital data structure of claim 1 wherein the relative spatial relationship data and automatically generated angular adjustment data determine a relative angular position of at least one cell site component relative to the elevated antenna holding structure to within about 3°.

7. The digital data structure of 6 wherein the relative angular position is determined to within about 1°.

8. The digital data structure of claim 1 wherein the relative spatial relationship data and automatically generated angular adjustment data determine a geographic direction of at least one cell site component to within about 3°.

9. The digital data structure of claim 1 wherein the digital data structure further comprises adequate information to determine the relative spatial relationships to less than about 0.1 cm and to eliminate the perspective distortions to less than about 0.1 cm.

10. The digital data structure of claim 1 wherein the digital data structure further comprises at least one of a) geographic location of the cell site, b) altitude of the cell site, c) date/time of the digital images, and d) gps coordinates of the cell site.

11. The digital data structure of claim 10 wherein the wherein the digital data structure further comprises all of a) geographic location of the cell site, b) elevation of the cell site, c) date/time of the digital images, and d) gps coordinates of the cell site.

12. The digital data structure of claim 1 wherein the digital data structure further comprises comments manually added by a user.

13. The digital data structure of claim 1 wherein the digital data structure further comprises at least one historic digital representation of the cell site comprised of historic digital images depicting a historic view of the cell site, the historic digital representation comprising adequate spatial relationship information to determine historic relative spatial relationships between at least the antenna holding structure and the cellular antennas to less than about 1.0 cm and contains historic angular adjustment data adequate to eliminate perspective distortions between the viewing angle of the historic imaging device creating the historic digital images and cell site components to less than about 1.0 cm.

14. The digital data structure of claim 13 wherein the digital data structure further comprises a plurality of historic digital representations of the cell site with each historic digital representation identified chronologically.

15. The digital data structure of claim 13 wherein the digital data structure further comprises algorithms configured to compare the digital representation of the cell site to the historic digital representation of the cell site.

16. The digital data structure of claim 15 wherein the digital data structure further comprises algorithms configured to specifically display to a user any differences found between the digital representation of the cell site and the historic digital representation of the cell site.

17. The digital data structure of claim 1 wherein the digital data structure further comprises algorithms configured to automatically identify and label display elements in a display of the digital data structure to a user, the display elements comprising all of a) the cell site components, b) elevation of the cell site components relative to the imaging device, c) geographic position of the cell site, d) geographic direction of at least one cell site component, and e) relative angular position of at least one cell site component relative to the elevated antenna holding structure.

18. The digital data structure of claim 1 wherein the digital representation of the cell site further comprises an image of a length-standard element placed on the cell site.

19. The digital data structure of claim 18 wherein the digital data structure further comprises algorithms configured to automatically identify and label a length of at least one cell site component to a user based on the length-standard element placed on the cell site.

20. The digital data structure of claim 1 wherein the digital representation of the cell site further comprises an image of a color-standard element placed on the cell site.

21. The digital data structure of claim 20 wherein the digital data structure further comprises algorithms configured to automatically identify and label a color of at least one cell site component to a user based on the color-standard element placed on the cell site.

22. The digital data structure of claim 21 wherein the digital data structure further comprises at least one historic digital representation of the cell site comprising the color-standard element placed on the cell site, and the algorithms are further configured to automatically determine and identify age of the at least one of the elevated antenna holding structure and the cell site component based on color change over time.

23. The digital data structure of claim 22 wherein the algorithms are configured to automatically determine and identify age of at least the elevated antenna holding structure and the cell site component based on color change over time.

24. The digital data structure of claim 20 wherein the algorithms further automatically identify and label colorcoding associated with the coaxial cables.

25. The digital data structure of claim 20 wherein the digital data structure further comprises color correction algorithms data configured to read an ambient wavelength response of the color-standard element due to ambient conditions and automatically adjust color information within the digital data structure to adjust for the ambient conditions.

* * * * *